(12) United States Patent
Hasegawa

(10) Patent No.: US 6,199,012 B1
(45) Date of Patent: Mar. 6, 2001

(54) MAP DISPLAY UNIT

(75) Inventor: Shinichi Hasegawa, Shizuoka-ken (JP)

(73) Assignee: Jatco Corporation, Shizuoka-ken (JP)

( * ) Notice: Subject to any disclaimer, the term of this patent is extended or adjusted under 35 U.S.C. 154(b) by 0 days.

(21) Appl. No.: 09/404,762

(22) Filed: Sep. 24, 1999

(30) Foreign Application Priority Data

Sep. 25, 1998 (JP) .................................................. 10-270986

(51) Int. Cl.7 .............................. G06G 7/78; G01C 21/00
(52) U.S. Cl. ...................... 701/208; 701/212; 340/990; 340/995
(58) Field of Search .................... 701/208, 212; 340/990, 995

(56) References Cited

U.S. PATENT DOCUMENTS

| | | | | |
|---|---|---|---|---|
| 5,189,430 | * | 2/1993 | Yano et al. | 342/457 |
| 5,212,643 | * | 5/1993 | Yoshida | 701/212 |
| 5,450,343 | * | 9/1995 | Yurimoto et al. | 701/208 |
| 5,777,875 | * | 7/1998 | Miyano | 364/188 |
| 5,848,375 | * | 12/1998 | Nunobiki et al. | 701/212 |
| 5,850,618 | * | 12/1998 | Suetsugu et al. | 701/210 |
| 5,862,510 | * | 1/1999 | Saga et al. | 701/211 |
| 5,902,343 | * | 5/1999 | Hale et al. | 701/50 |
| 5,919,245 | * | 7/1999 | Nomura | 701/207 |
| 5,925,091 | * | 7/1999 | Ando . | |
| 5,928,304 | * | 7/1999 | Priess | 701/200 |
| 5,945,927 | * | 8/1999 | Nakayama et al. | 340/995 |
| 5,951,622 | * | 9/1999 | Nomura | 701/212 |
| 5,974,876 | * | 11/1999 | Hijikata et al. | 73/178 R |
| 6,006,161 | * | 12/1999 | Katou . | |
| 6,023,655 | * | 2/2000 | Nomura | 701/208 |

* cited by examiner

Primary Examiner—William A. Cuchlinski, Jr.
Assistant Examiner—Olga Hernandez
(74) Attorney, Agent, or Firm—Blank Rome Comisky & McCauley LLP

(57) ABSTRACT

A group of maps corresponding to the present position detected by a position detection unit is retrieved from a storage unit. Also, a map on the same scale as a map being displayed is extracted from the retrieved group of maps. If there is an overlapped portion between the extracted map and the map being displayed, they are displayed with the overlapped portion held. With this, both the map being displayed and the extracted map can be displayed as if they were continuous to each other, and the present-position mark can be displayed without being jumped considerably.

4 Claims, 17 Drawing Sheets

F I G. 5
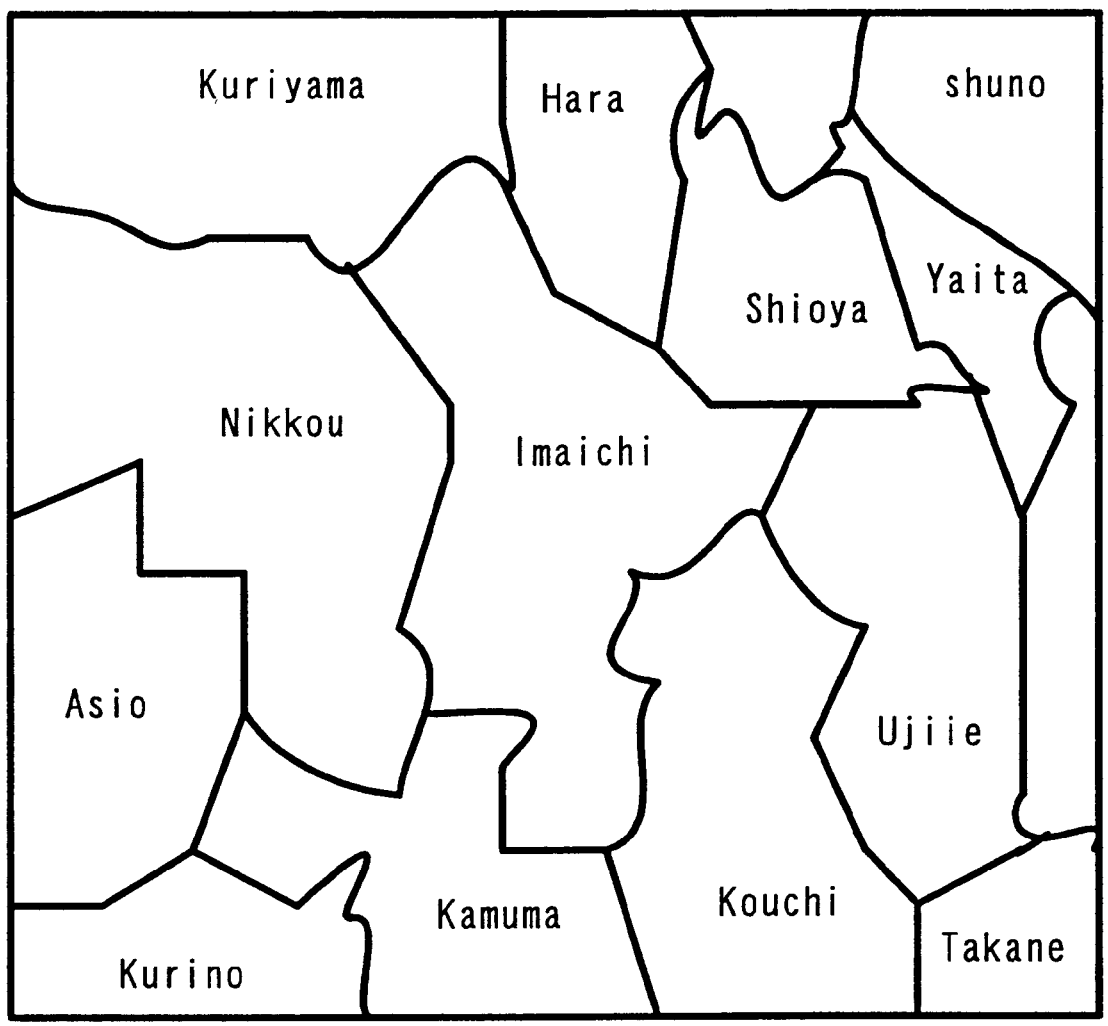

MAP DISPLAY UNIT

FIELD OF THE INVENTION

The present invention relates to a map display unit that utilizes, for example, global positioning system (GPS) satellites to measure its present position and displays a mark representing the present position along with map information, and more particularly to a map display unit suitable for carrying.

DESCRIPTION OF THE RELATED ART

As shown in FIG. 16, a navigation system mounted in a vehicle is constructed of a GPS antenna 1, a GPS receiver 2, a navigation control section 3, a CD-ROM drive unit 4, and a display unit 5. Radio wave 7 from each of a plurality of GPS satellites 6 is received with the GPS antenna 1. The received signal is modulated with the GPS receiver 2 in order to measure the present position of the system. Also, the navigation control section 3 synthesizes a mark representing the present position and the map information read out from the CD-ROM drive unit 4. The synthesized information is sent to the display unit 5 to give the driver or the passenger visual route guidance. The vehicle navigational system, however, is bulky and unsuitable for carrying.

Hence, there is a portable GPS receiver can be carried. In a GPS receiver without a CD-ROM drive unit as an example, as illustrated in FIG. 17, after selecting a necessary range 8a from the map information displayed on a map server 8, the map information included in the range 8a is downloaded from the map server 8 to a GPS receiver 9. The map server 8 employs, for example, a personal computer. A map disk 11 is shoved into the CD-ROM drive unit 10 of the map server 8. Then, the map server 8 executes a predetermined application program to transmit the map information included in the selected range to the GPS receiver 9. The transmitted map information is stored in the semiconductor storage memory of the GPS receiver 9. Thereafter, the stored map information is carried by the GPS receiver 9 and used for displaying a map.

Incidentally, the map disk 11 stores map information on various reduced scales from one which can overlook the entire territory to one which can overlook a partial region so that the shape of a building, etc. can be pinpointed, even when limited to Japanese territory, for example.

Therefore, the map information transmitted to the GPS receiver 9 includes map information in various scale levels of the selected range. For instance, when the "Kanto-Chubu" district is selected, the map information includes a wide-area map (first level- small scale far-off view) of the entire district, a sectional map (second level- medium scale) of each prefecture, etc., and a detailed map (third level-large scale) of each city, etc. Note that the number of levels is merely an example.

Carrying information about maps different in reduced scale is easy to use. The reason is that a small-scale map of a large area is easy to view in planning a route, while a large-scale map of a small area is easy to view at a place near an intermediate point or a destination.

However, a large-scale map (large-level map) is suitable for obtaining detailed information about geographical features or roads and for guiding routes, but display maps are frequently switched with movement of the present position. For this reason, there is a problem that the position of a mark (representing the present position) displayed on the screen of the GPS receiver 9 will frequently jump from one place to another every time a map is switched to another, causing a sense of incongruity.

SUMMARY OF THE INVENTION

It is an object of the present invention to provide a map display unit that is capable of avoiding a great jump of a present-position mark according to map-switching to eliminate a sense of incongruity in the screen, by taking advantage of the overlapped portion between adjacent maps in map information.

To achieve the foregoing object and in accordance with one important aspect of the present invention, there is provided a map display unit, which comprises (1) position detection means for detecting its present position, (2) storage means for storing information about maps on various scales, (3) retrieval means for retrieving a group of maps corresponding to the present position detected by the position detection means from the storage means, (4) extraction means for extracting a map on the same scale as a map being displayed from the retrieved group of maps, and (5) display control means for performing a process of synthesizing the extracted map and a mark representing the present position and then displaying them on display means. Also, when there is an overlapped portion between the extracted map and the map being displayed, the display control means performs the synthesizing process with the overlapped portion held.

According to the present invention, a group of maps corresponding to the present position detected by the position detection means is retrieved from the storage means. Also, a map on the same scale as a map being displayed is extracted from the retrieved group of maps. If there is an overlapped portion between the extracted map and the map being displayed, the display control means performs the synthesizing process with the overlapped portion held. With this, both the map being displayed and the extracted map can be displayed as if they were continuous to each other, and the present-position mark can be displayed without being jumped considerably. Therefore, the display is nice to look at and a good sense of operability can be obtained.

In another important aspect of the present invention, there is provided a map display unit, which comprises (1) position detection means for detecting its present position, (2) storage means for storing information about maps on various scales, (3) retrieval means for retrieving a group of maps corresponding to the present position detected by the position detection means from the storage means, (4) extraction means for extracting a map on the same scale as a map being displayed from the retrieved group of maps; and (5) display control means for performing a process of synthesizing the extracted map and a mark representing the present position and then displaying them on display means. Also, when the present position moves out of a map being displayed and a new present position is not present in the stored maps, the display control means displays the new present position at a relative position with respect to the map being displayed, without a map.

According to the present invention, when the present position moves out of a map being displayed and a new present position is not present in the stored maps, the new present position is displayed at a relative position with respect to the map being displayed, without a map. With this, a map without an overlapped portion can be utilized without hindrance.

In a preferred form of the present invention, the map being displayed, a position at which the present position moves out of the map being displayed, and the new present position are displayed at the same time.

According to the preferred form of the present invention, the map being displayed, a position at which the present position moves out of the map being displayed, and the new present position can be displayed at the same time. Therefore, when the present position moves over an area having no map, route guidance can be performed with "the position at which the present position moves out of a map" as a reference.

In another preferred form of the present invention, when the map being displayed is moved out of the screen by movement of the new present position, the display control means displays the direction and distance of the present position with respect to a position at which the map being displayed is moved out, along with the new present position. Therefore, by making reference to the direction and distance of the present position, route guidance can be reliably performed in moving over an area having no map.

In still another preferred form of the present invention, there is provided a map display unit, which comprises (1) position detection means for detecting its present position, (2) storage means for storing information about maps on various scales, (3) retrieval means for retrieving a group of maps corresponding to the present position detected by the position detection means from the storage means, (4) extraction means for extracting a map on the same scale as a map being displayed from the retrieved group of maps, and (5) display control means for performing a process of synthesizing the extracted map and a mark representing the present position and then displaying them on display means. Also, when the present position moves out of a map being displayed and a new present position is not present in the stored maps, the display control means displays the new present position at a relative position with respect to the map being displayed, without a map. Furthermore, when at least a portion of another map of the stored maps can enter the screen on which the present position is being displayed, the portion of the other map and the new present position on an area having no map are displayed at the same time.

Therefore, by making reference to the other map, route guidance can be reliably performed in moving over an area having no map.

BRIEF DESCRIPTION OF THE DRAWINGS

The above and other objects and advantages will become apparent from the following detailed description when read in conjunction with the accompanying drawings wherein:

FIG. 5 is the actual map of M1/1 (second level map in the hierarchical memory structure of FIG. 3);

DETAILED DESCRIPTION OF THE PREFERRED EMBODIMENTS

An embodiment of the present invention, applied to a portable map display unit of a GPS-antenna integrated type, will hereinafter be described in reference to the drawings.

Figure 1:
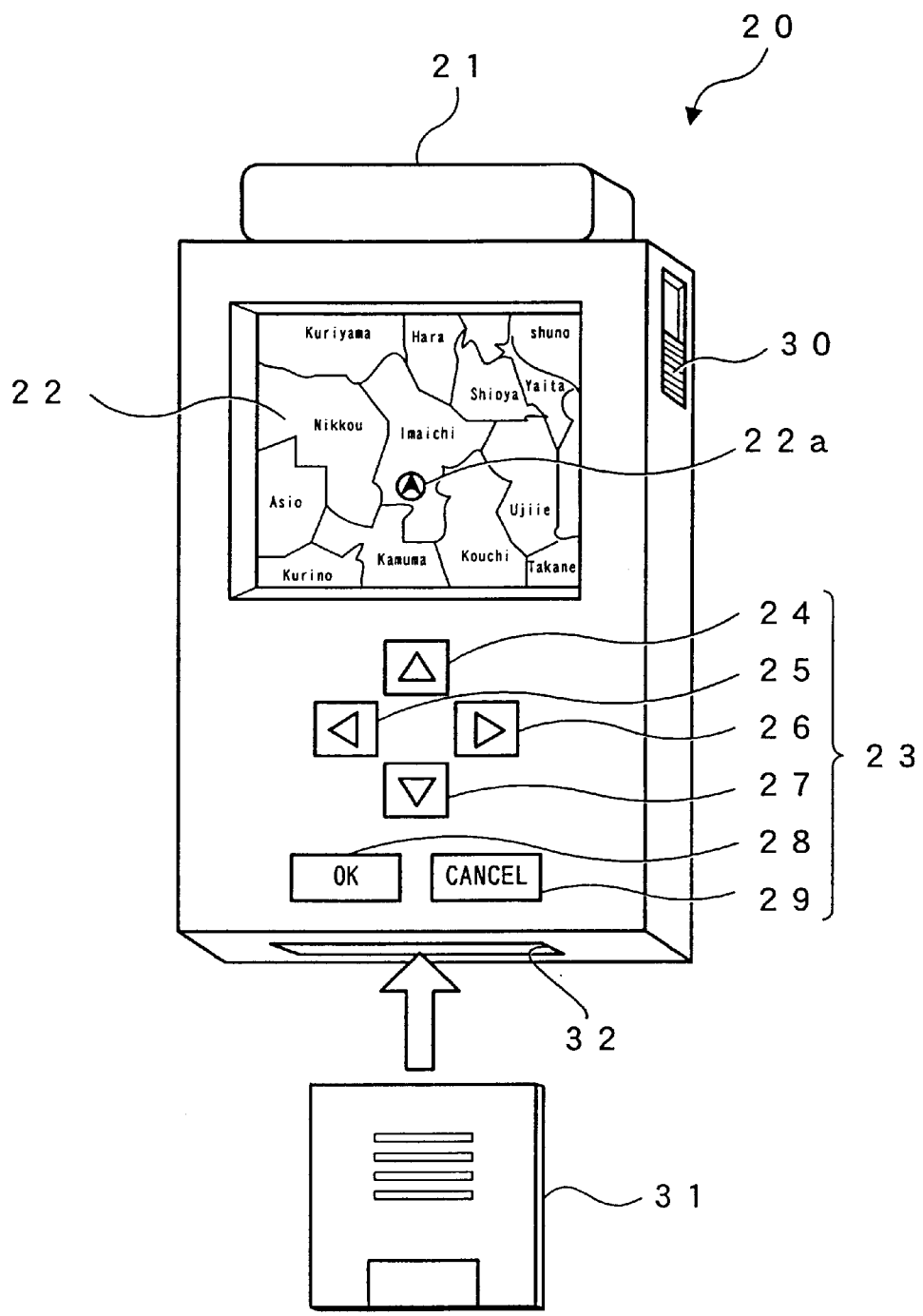
FIG. 1 is a perspective view showing a map display unit.

In FIG. 1, reference numeral 20 denotes a portable map display unit. This portable map display unit 20 has a GPS antenna 21 attached to the top surface thereof. The map display unit 20 is provided at the front surface thereof with a liquid crystal display 22 and a key switch group 23 (e.g., up, down, right, and left direction keys 24–27, OK key 28, cancel key 29, etc.). Reference numeral 22a denotes a present-position mark. Also, the map display unit 20 is provided at the right surface thereof with a slide-type power switch 30 and at the bottom surface thereof with an inserting hole 32 for a small memory card (storage means) 31. The memory card 31 is referred to as a smart medium for convenience.

Figure 2:
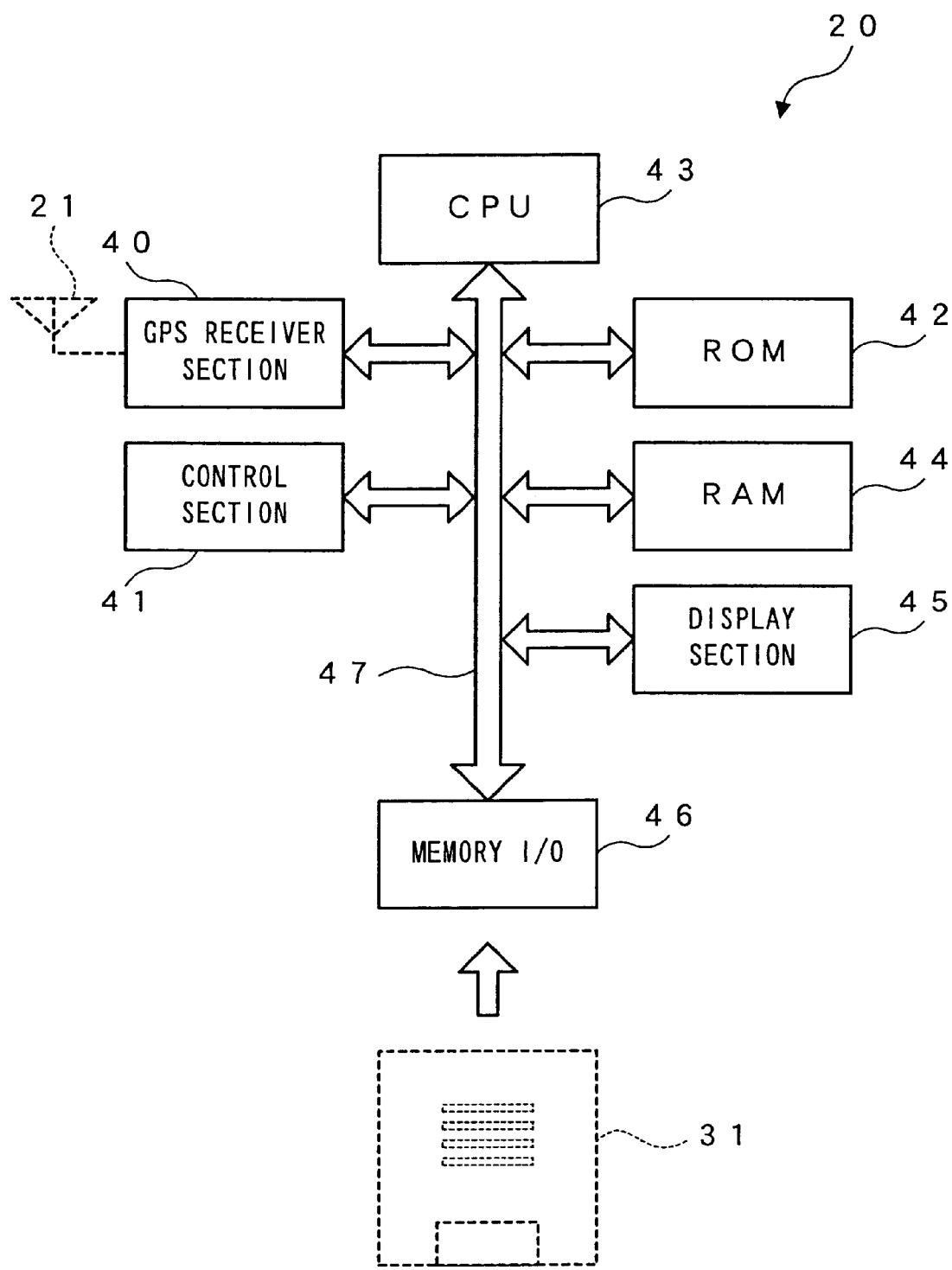
FIG. 2 is a block diagram showing the internal construction of the map display unit shown in FIG. 1.

FIG. 2 shows a block diagram of the map display unit 20. The map display unit 20 is constructed of a GPS receiver section (position detection means) 40 for modulating a signal received through the GPS antenna 21 to measure the present position of the unit 20, a control section 41 including the key switch group 23, a ROM 42 in which a program and data necessary for displaying a map are stored, a CPU (which constitutes retrieval means, extraction means, and display control means) 43 for executing the program, a RAM 44 employed as a working area for the CPU 43, a display section (display means) 45 including the liquid crystal display 22, and a memory mapped I/O 46 for interfacing with the memory card 31. These sections are interconnected by a bus 47.

Figure 17:
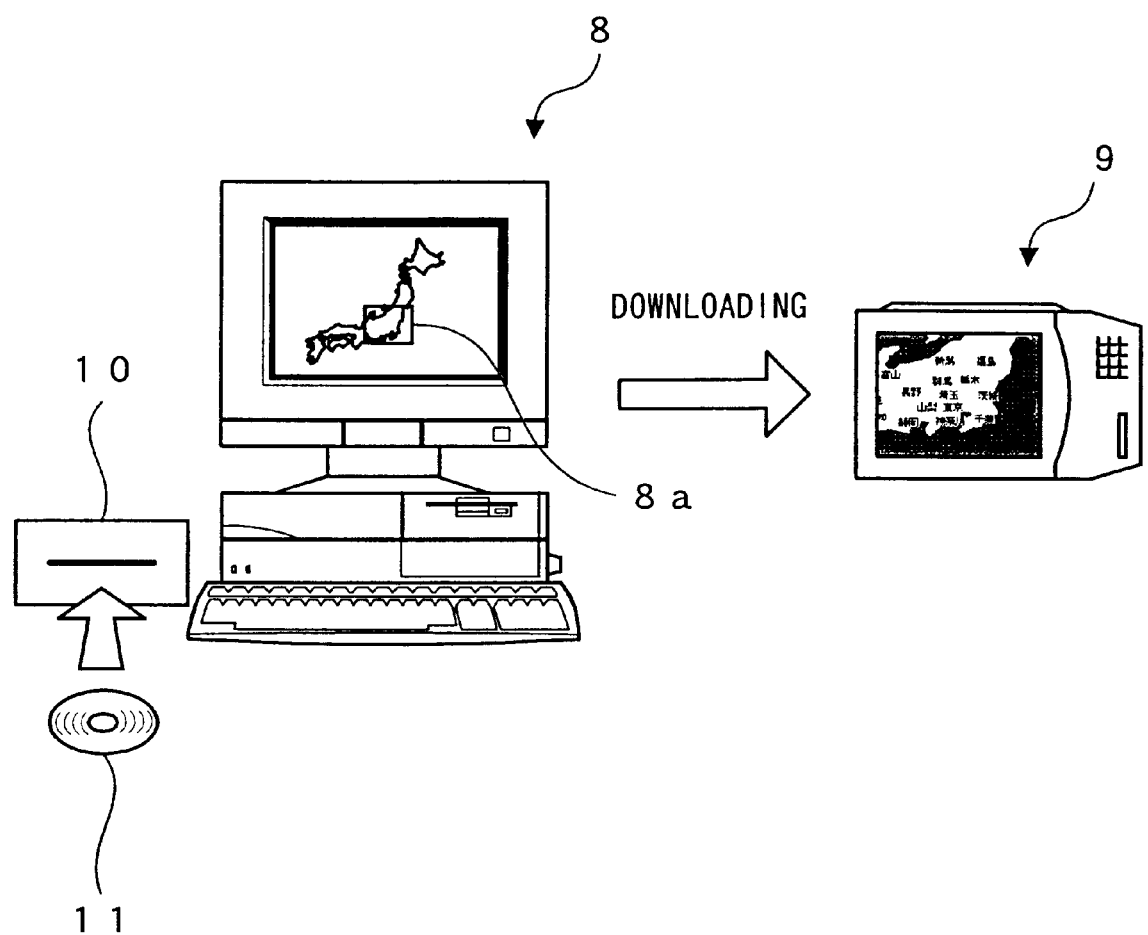
FIG. 17 is a diagram showing how map information is downloaded from a map server to a portable map display unit.

The memory card 31 (storage means) stores, for example, map information downloaded from the map server 8 shown in FIG. 17. The memory card 31 does not have as much storage capacity (540 MB) as the map disk, but has enough storage capacity for storing only necessary map information. Of course, instead of the memory card 31, flash memory, a CD-ROM drive, or a DVD-ROM drive may be employed.

Figure 3:
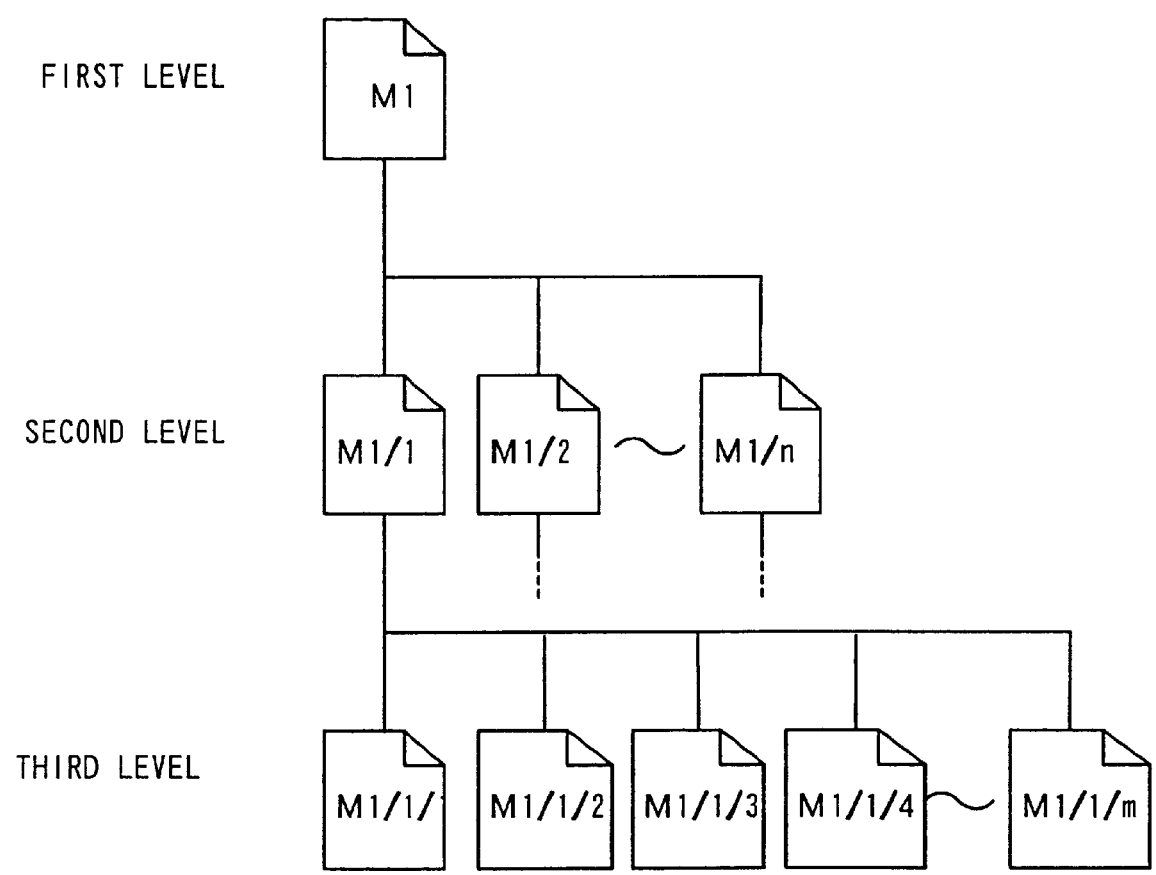
FIG. 3 is a diagram showing the three-level memory structure used in the memory card shown in FIG.

FIG. 3 shows the map information stored in the memory card 31. The memory card 31 has a hierarchical memory structure, which consists of a first level(small-scale) where a wide-area map of, for example, the "Kanto-Chubu" district is located, a second level(medium-scale) where sectional maps of the same district are located, and a third level(large-scale) where detailed maps of the same district are located.

In FIG. 3, reference character M1 denotes a wide-area map, M1/1 denotes a first sectional map of M1, and M1/1/1 denotes a first detailed map of M1/1. According to this hierarchical structure, one wide-area map, n sectional maps, and m detailed maps are stored.

Note that the relation of reduced scales is "wide-area maps"<"sectional map"<"detailed map." In the illustrated example, although three kinds of maps on a reduced scale are stored, these three kinds are shown merely for simplifying explanation. In practice, many kinds of maps on a reduced scale are stored, and accordingly, the memory card 31 has a hierarchical memory structure of three levels or more.

Figure 4:
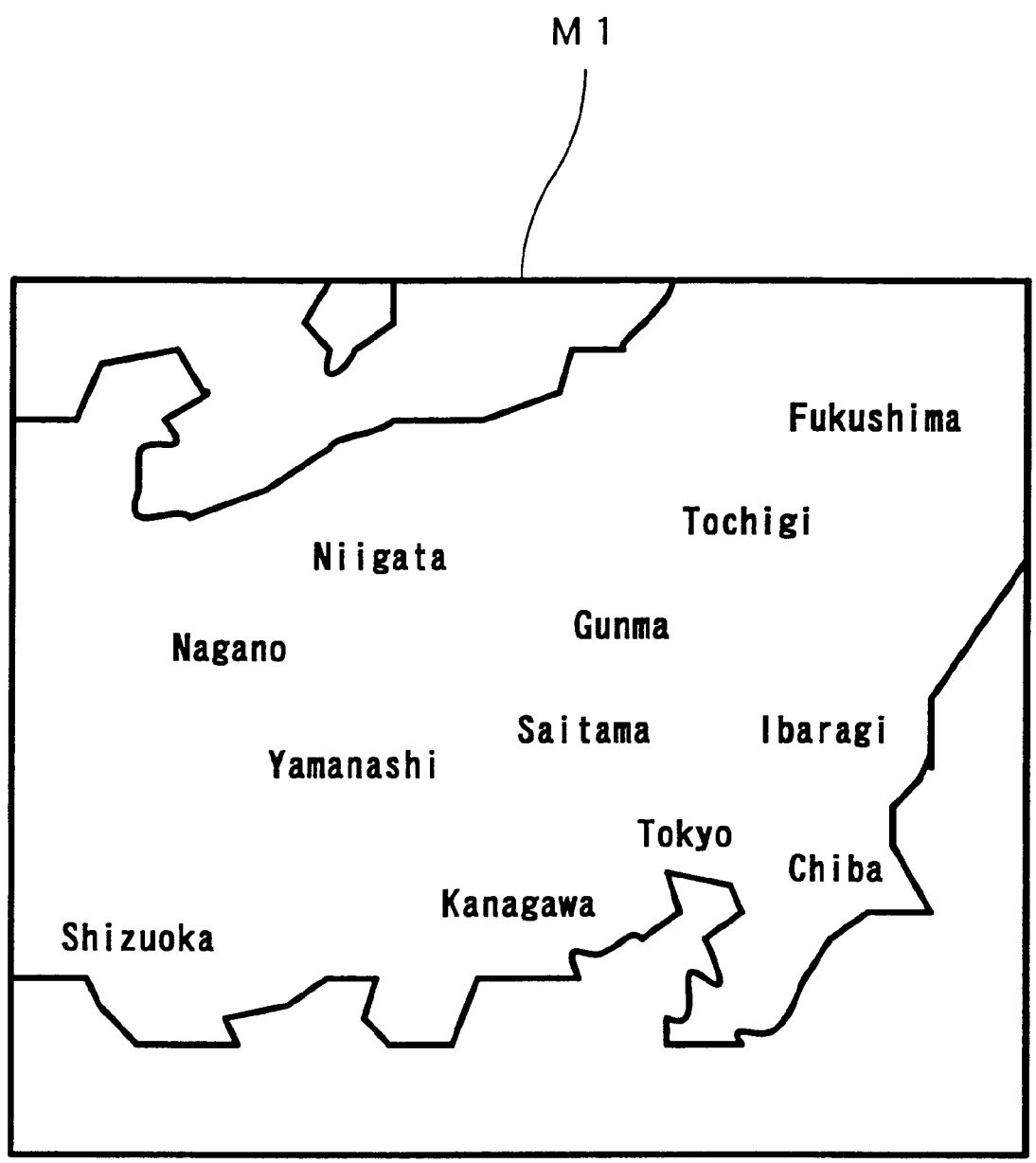
FIG. 4 is the actual map of M1 (first level map in the hierarchical memory structure of FIG. 3)
Figure 6:
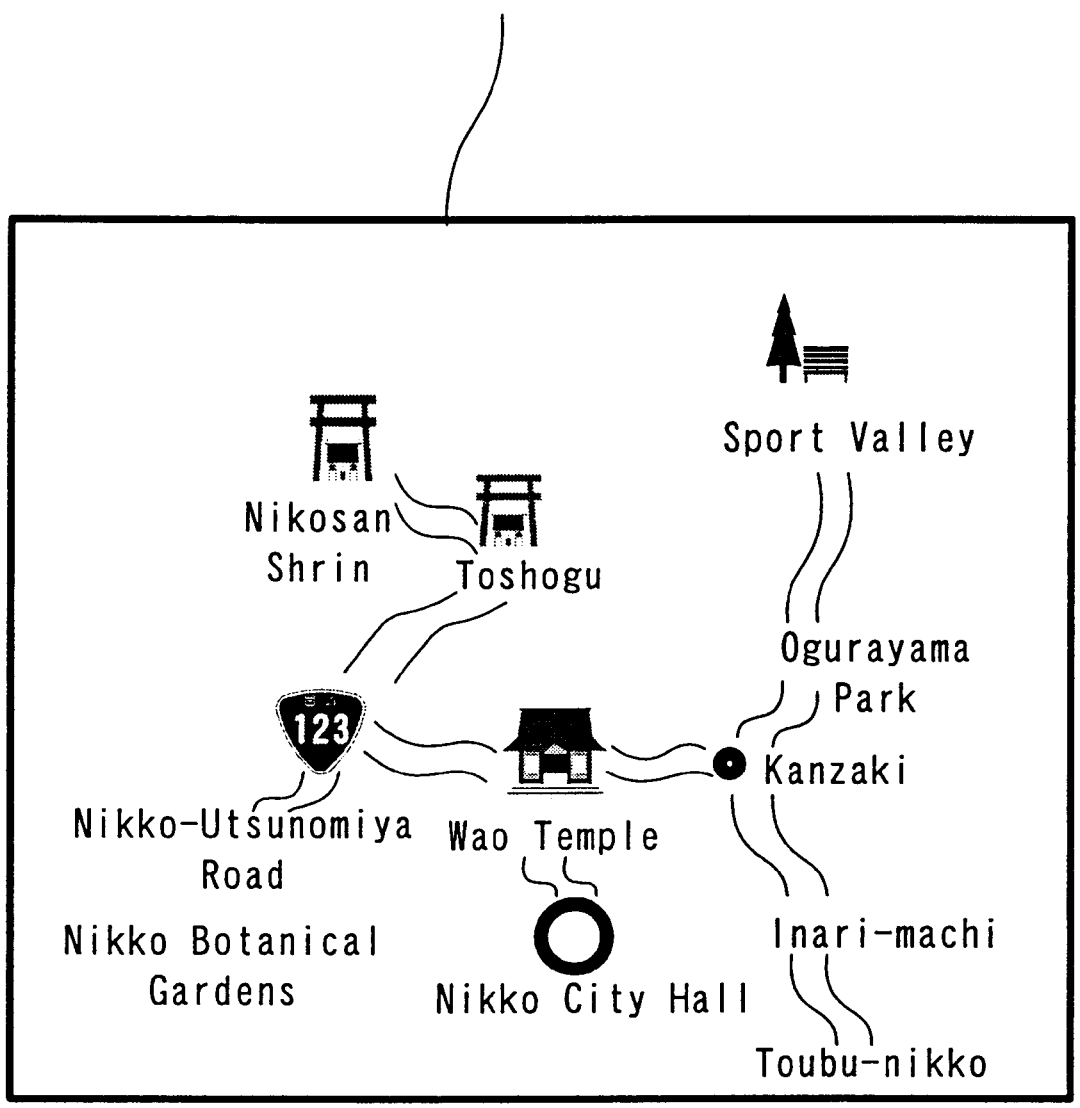
FIG. 6 is the actual map of M1/1 (third level map in the hierarchical memory structure of FIG. 3)

FIG. 4 shows the actual map of M1 (wide-area map of the "Kanto-Chubu" district), FIG. 5 shows the actual map of M1/1 (sectional map including the "Nikko" city), and FIG. 6 shows the actual map of M1/1/1 (detailed map including the "Nikko-toshogu"). The form of drawing these maps may be a vector form or a drawing form, but must have at least coordinate information about a longitude and a latitude. For example, each map may have coordinate information about a corner pixel so that the coordinate values of an arbitrary point on the map can be calculated from the corner coordinate information by complementary calculations.

Now, assuming the present place is included somewhere in the first detailed map (M1/1/1), a map to be displayed may be the first detailed map (M1/1/1), the first sectional map (M1/1) in the higher level than that, or the wide-area map (M1) in the highest level. When starting to the destination, it is desirable to display the wide-area map or first sectional map that can overlook a wide range. At a place near an intermediate place or destination, it is desirable to display the detailed map that can pinpoint fine circumstances.

On the other hand, if the detailed map (M1/1/1) in the third level were displayed at a place near an intermediate place, the present position will move out of that map sooner or later with the movement thereof. In that case, if there is no rule about the reduced scale of a map to be displayed next, the sectional map (M1/1) in the second level is displayed or the wide-area map (M1) in the first level is displayed, and consequently, a switch of maps is unnaturally performed and causes a sense of incongruity.

Hence, this embodiment decides the following rule.

Figure 7:
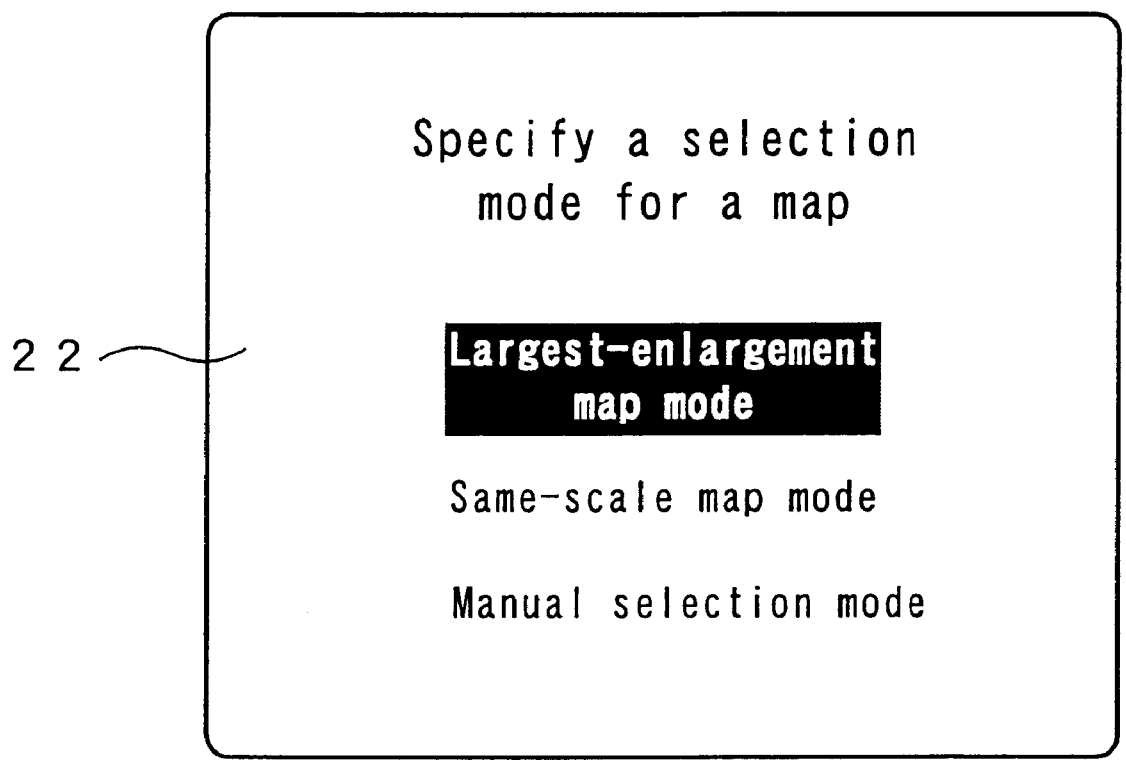
FIG. 7 is a diagram showing the mode specifying menu screen displayed on the liquid crystal display of FIG. 1.

FIG. 7 shows the "menu screen for specifying a selection mode for a map" displayed on the liquid crystal display 22 just after the power switch 30 of the map display unit 20 has been turned on (or after a display of an arbitrary initial screen).

In addition to a message, "Specify a selection mode for a map," three menu items, "largest-enlargement map mode," "same-scale map mode," and "manual selection mode" are displayed on the screen. These modes can be selected with the direction keys 24 and 27, and the selected mode can be decided with the OK key 28.

(1) Largest-enlargement map mode:

If this mode is decided, the largest-enlargement map (i.e., largest-scale map) in the maps stored in the memory card 31, including the present position, is displayed on the screen. That is, in the hierarchical structure of the map information of FIG. 3, the detailed map (M/1/i where i=1, 2, ..., and m) in the third level is displayed. This detailed map (M/1/i), as previously described, is a detailed map of a city, etc., and a map drawn in greater detail than that is not present. Therefore, according to this "largest-enlargement map mode," a detailed map suitable in moving over complicated geographical features or a city can be displayed, whereby the accuracy of route guidance can be enhanced.

Note that, depending on the degree of a reduced scale (particularly, a reduced scale that can know the shape of a building), there are cases where the corresponding map is not prepared in the map disk 11 shoved in the CD-ROM drive unit 10 of the map server 8 of FIG. 17. For instance, the detailed maps presently include only main cities. For this reason, if the largest-enlargement map is used as a map on a scale of ½,500 or ⅕000, there will be no map to which the largest-enlargement map is switched, when the present position moves to suburbs.

In such a case, the two following cases are applied. The first rule is to select a "map including the present position and also having a reduced scale near to the largest scale" in the maps stored in the memory card 31. When this rule is applied, it is desirable to display a note that the reduced scale has been changed. The second rule is to continue to display only the present position without displaying a new map. The portion on the screen having no map has a monochromatic color (e.g., white).

(2) Same-scale map mode:

In the aforementioned largest-enlargement map mode, the largest-enlargement map (i.e., the largest-scale map) is always selected. As previously described, a sufficient number of the largest-scale maps is not prepared except large cities, so the change of a reduced scale frequently occurs depending on districts and this frequent change is not nice to look at.

Hence, in such a district, the "same-scale map mode" is selected. In this mode, an arbitrary reduced scale can be specified. Thereafter, the map on the specified scale can be selected and displayed. For example, if the largest scale is specified, the mode is the same as the aforementioned "largest-enlargement map mode." However, if a reduced scale (i.e., the reduced scale of a sufficient number of maps prepared at each district) smaller than the largest-enlargement map mode is specified, the change of the reduced scale will not occur and this will be nice to look at.

(3) Manual selection mode:

In this mode, information about all maps including the present position, stored in the memory card 31, is displayed as a list along with the reduced scales and is manually selected. Time is required, but a map on an optimal scale can be displayed. Also, even in the case where the present position moves out of a map being displayed, information about all the corresponding maps is displayed as a list along with the reduced scales.

(4) Change of a mode:

As previously described, the aforementioned three modes can be selected immediately after the power switch 30 has been turned on. Furthermore, if a change can be made from an arbitrary mode to another mode, it is desirable, because the operability is enhanced. For instance, icons for all the modes may be displayed on the lower portion of the screen. In this case, an icon for a mode being executed is reversely displayed, and if an icon other than that is selected with the right and left keys 25 and 26 and decided with the OK key 28, the mode being executed will be switched to the mode allocated to the decided icon.

(5) Countermeasure in each mode when there is no corresponding map:

When maps are downloaded from the map server, maps in all ranges including a planed route should be specified, but there are cases where the range is erroneously specified or the plan is changed during movement.

In such a case, there is a situation that even in any of the aforementioned modes, a map to be displayed has not been stored in the memory card 31, so that only the present-position mark is displayed. In order to avoid such a situation, a map on a predetermined scale is downloaded in the memory card 31 regardless of user's specification, when maps are downloaded from the map server.

The predetermined-scale map here means one that must overcome a barrier when the present position moves out of the range of the map. For example, when going out from our territory, a predetermined procedure (procedure for departure from a country) must be performed at a predetermined place, so the wide-area map of our territory is suitable as the predetermined-scale map. The predetermined-scale map may be constituted by one middle-area map or a plurality of divided maps. Note that when the map display unit 20 according to this embodiment is utilized in a foreign country (A country), the aforementioned "our territory" is replaced with an "A country."

Figure 8:
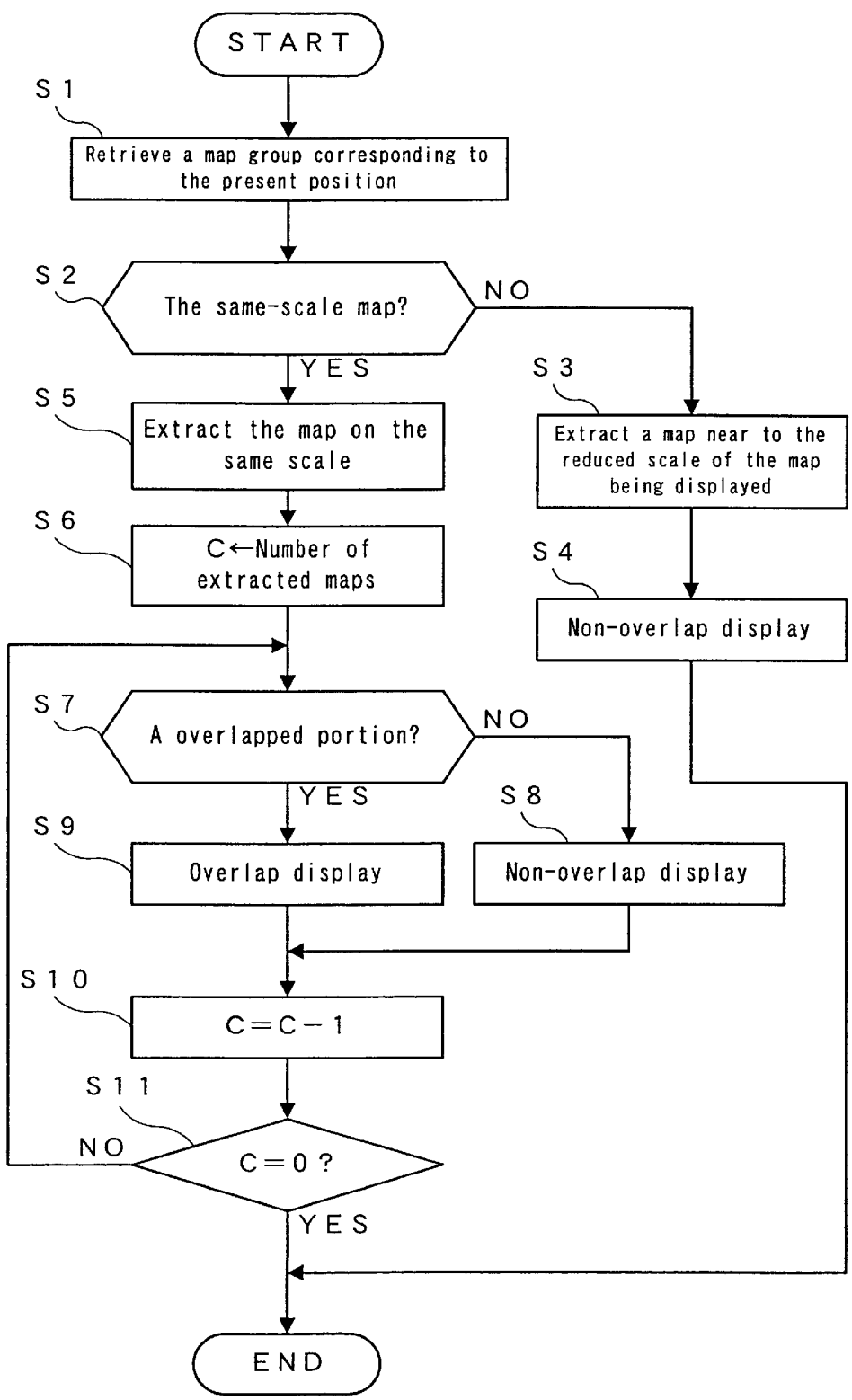
FIG. 8 is a flowchart showing a map displaying program including a display of overlap.

(6) Measure to avoid the jump of the present-position mark:

FIG. 8 shows a flowchart peculiar to this embodiment including a measure for avoiding the jump of the present-position mark. In this flowchart, a group of maps corresponding to the present position is retrieved from the maps stored in the memory card 31 (step S1). Then, it is judged whether or not in the map group there are maps on the same scale as the map presently being displayed (step S2). When there are no maps on the same scale, a map near to the reduced scale of the map being displayed is extracted from the map group (step S3). When the present position has moved into the extracted map, the extracted map and the present-position mark are synthesized and displayed (S4). The map displayed in this step is a map different in scale from the map previously displayed and is a map that does not overlap the previous map. This map will hereinafter be referred to as a map in a display of non-overlap.

On the other hand, in step S2, when maps on the same scale as the map presently being displayed are present in the map group corresponding to the present position, the maps on the same scale are extracted (step S5). The number of extracted maps is set to a variable C (step S6). Then, it is judged whether or not there is an overlapped portion between the first extracted map and the map being displayed (step S7). If there is no overlapped portion, the first extracted map and the present-position mark are synthesized and displayed when the present position has moved into the extracted map (step S8). This display in step S8 will hereinafter be referred to as a display of non-overlap. 1 is subtracted from the variable C (step S1). Then, it is judged whether or not the variable C is zero (step S11).

In the case where there is an overlapped portion between the jth extracted map and the map being displayed, when the present position has moved into the jth extracted map, the overlapped portion and the present-position mark are synthesized and displayed (step S9). 1 is subtracted from the variable C (step S10). Then, it is judged whether or not the variable C is zero (step S11).

Figure 9A:
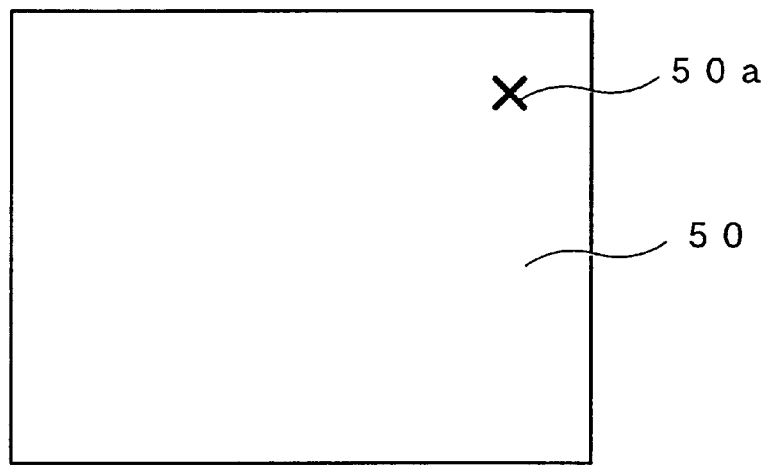
FIGS. 9A and 9B are diagrams showing a map being displayed and the jth extracted map.
Figure 9B:
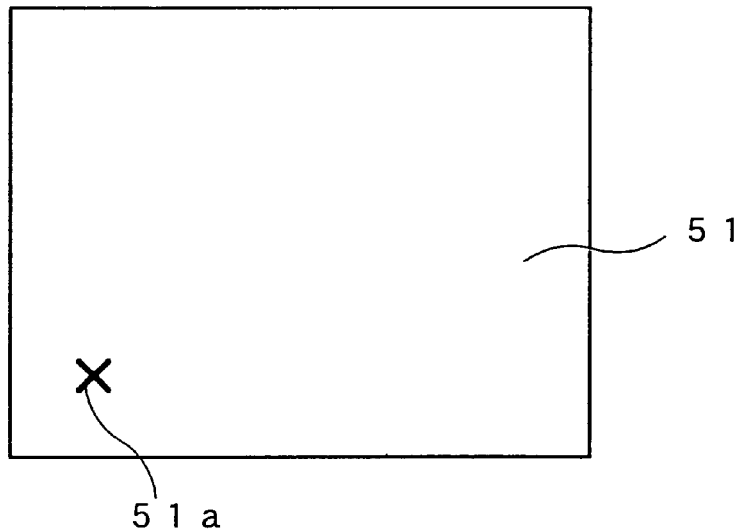
Figure 10:
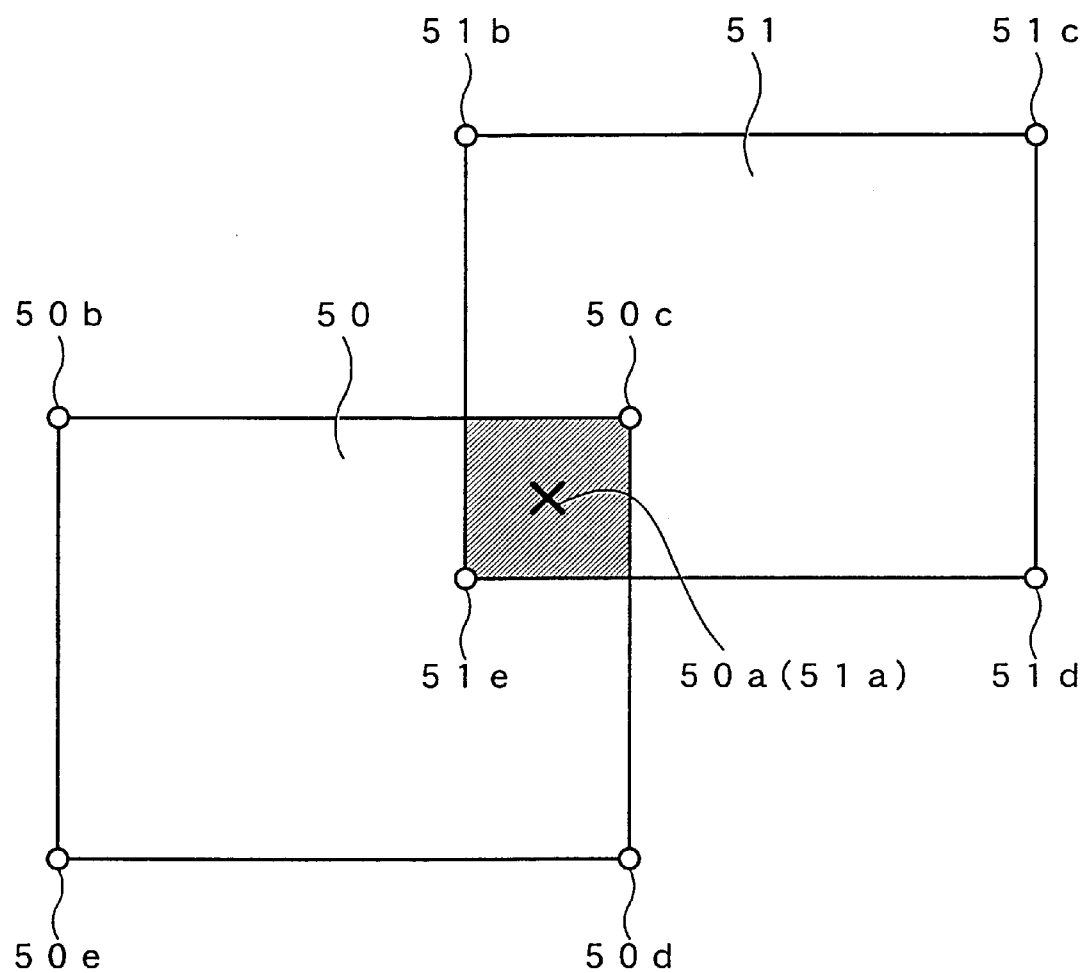
FIG. 10 is a diagram showing the relation of an overlap between the map being displayed and the jth extracted map.
Figure 11:
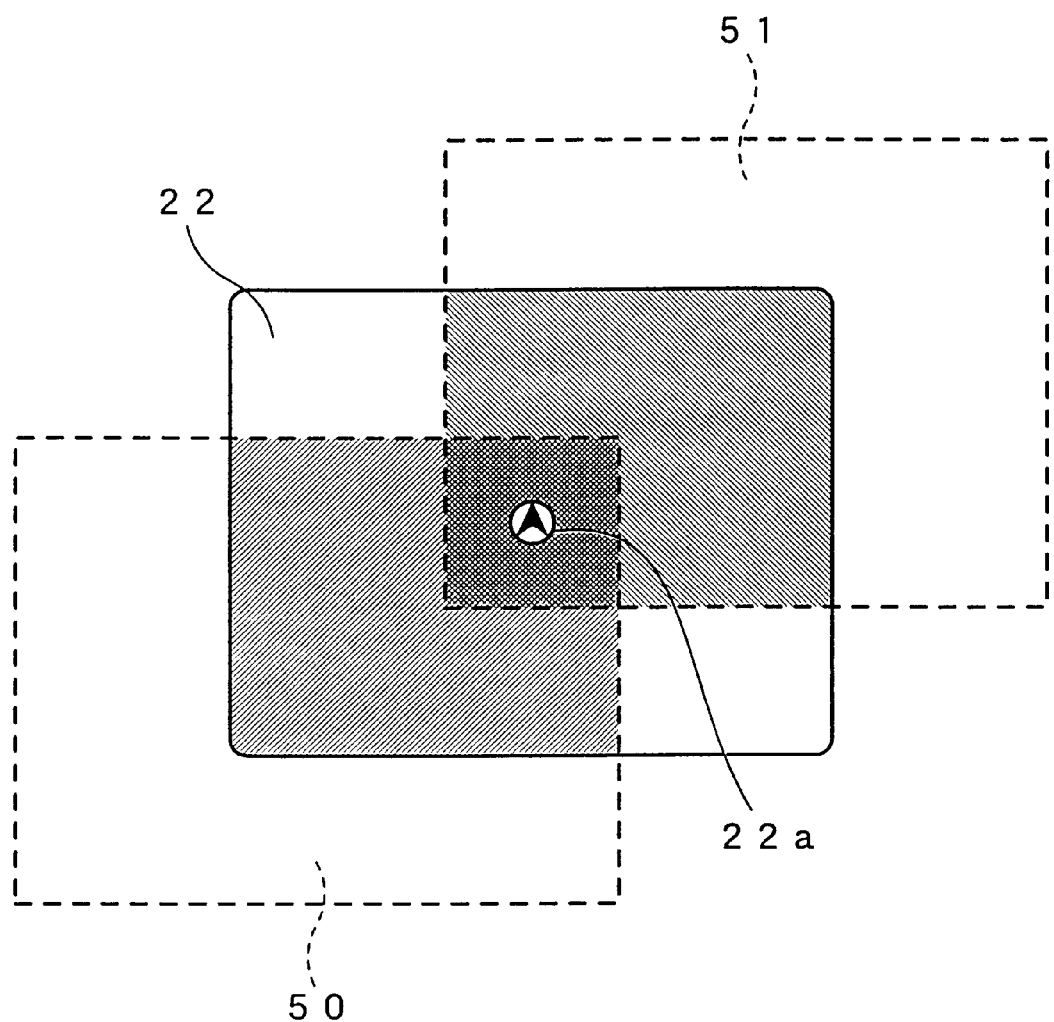
FIG. 11 is a diagram showing how the map being displayed and the jth extracted map are displayed.

FIGS. 9–11 show how the aforementioned display of overlap is made. In FIG. 9, reference numeral 50 denotes a map being displayed and 51 the jth extracted map. The mark of X at 50a represents the present position in map 50, and the mark X at 51a represents the same present position in map 51. That is, these two maps 50 and 51 partially overlap each other at a place near the present position 50a (51a), as shown in FIG. 10. The coordinates (latitude and longitude) of the corners of the map 50 are represented by 50b~50e. Likewise, the coordinates (latitude and longitude) of the corners of the map 51 are represented by 51b~51e. In the display of overlap in step S9, the map 50 being displayed and the jth extracted map 51 are displayed with this overlapped relation held. The overlap display is shown in FIG. 11. The liquid crystal display 22 displays the present-position mark 22a at the overlapped portion between the two maps 50 and 51. Note that the number of overlapped maps is at least two, a map being displayed and an extracted map, but may be 3 or more, depending on the contents of the map disk.

According to this embodiment, as described above, in the case where there is an overlapped portion between a map being displayed and the jth extracted map, the two maps are displayed as if they were one map and are also displayed with the overlapped portion held. Therefore, as shown in FIG. 11, the present-position mark 22a can be displayed without being jumped greatly. Also, the display is nice to look at and a good sense of operability can be obtained.

Figure 12:
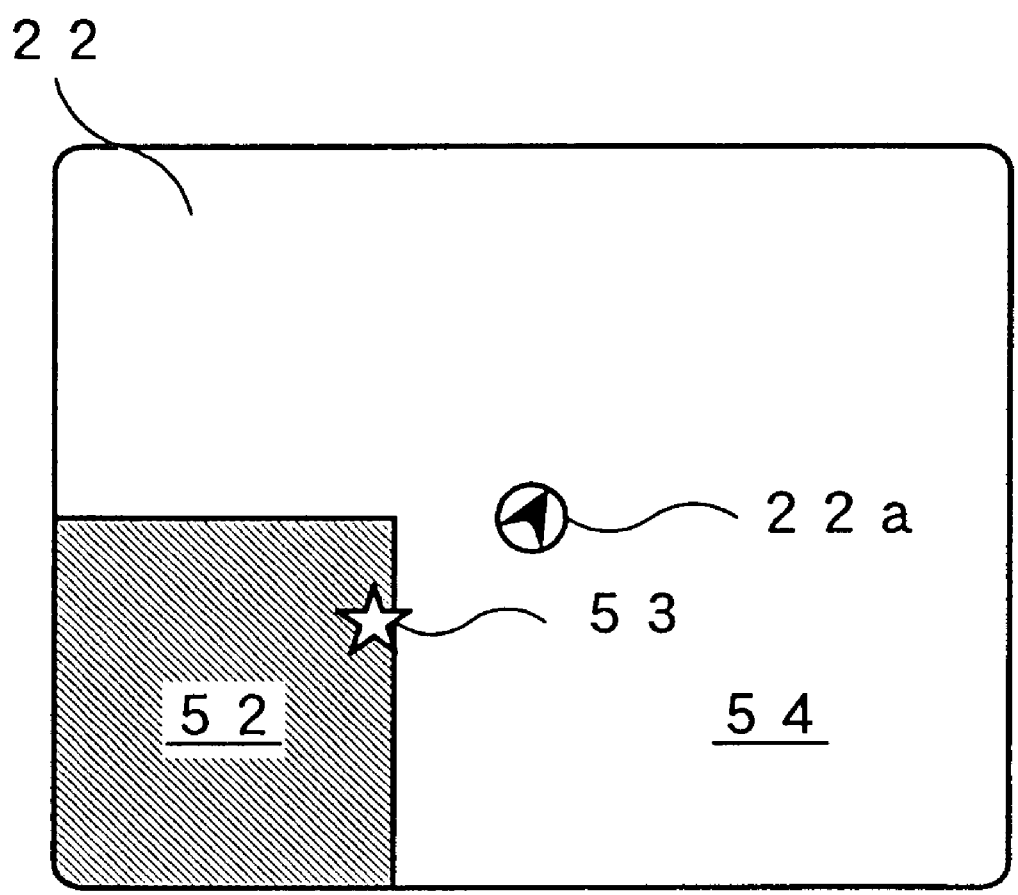
FIG. 12 is a diagram showing a no-map area where the last position is located.

Now, a description will be made with reference to the case of a map without an overlapped portion. FIG. 12 shows the state in which the present-position mark 22a has moved out of a map 52 being displayed and entered an area 54 having no map. Asterisk 53 denotes a spot where the present-position mark 22a was present last in the map 52 being displayed. In this manner, the spot 53, the map 52 including that spot, and the present-position mark 22a are displayed together. Therefore, even if a map did not have an overlapped portion, it can be used without hindrance.

Figure 13:
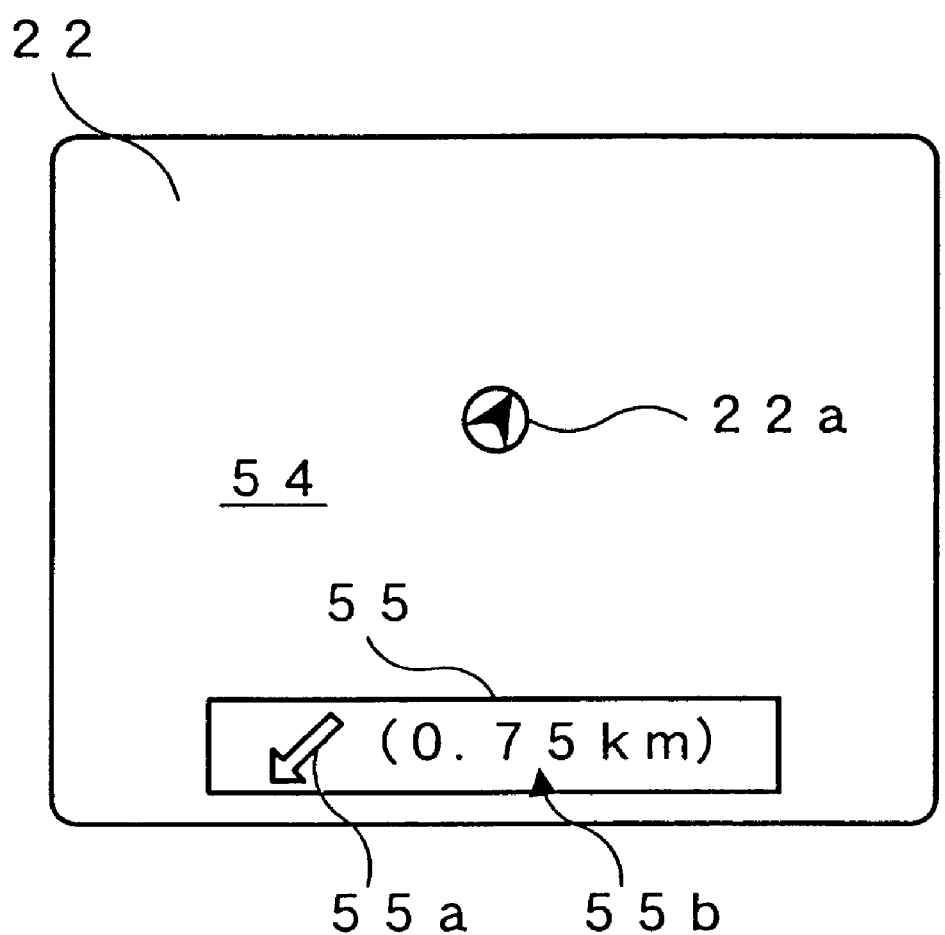
FIG. 13 is a diagram showing a no-map area that includes a guiding window for indicating a spot on the map where the last position was located.

However, in the case where the distance between the spot 53 and the present-position mark 22a is not so long, when the reduced scale of the map is large, for example, the conjecture of the present spot is not so difficult, but when the reduced scale is small, the grasp of a route by conjecture becomes difficult, because a few centimeters on a map will be equal from a few ten kilometers to as many as a few hundred kilometers in terms of actual length. FIG. 13 shows an example of the countermeasure. In the figure, reference numeral 55 denotes a display window for guidance. This guidance window 55 displays an arrow mark 55a indicating the last spot (e.g. the spot 53 in FIG. 12) on the map displayed just before (e.g., the map 52 in FIG. 12) and a distance 55b up to the same spot. According to the guidance window 55, even when walking (or traveling) over a no-map area 54, the grasp of a route by conjecture can be facilitated, because the direction and distance of the last spot (e.g. the spot 53 in FIG. 12) on the map displayed just before (e.g., the map 52 in FIG. 12) can be realized by the display of the arrow mark 55a and distance 55b.

Figure 14:
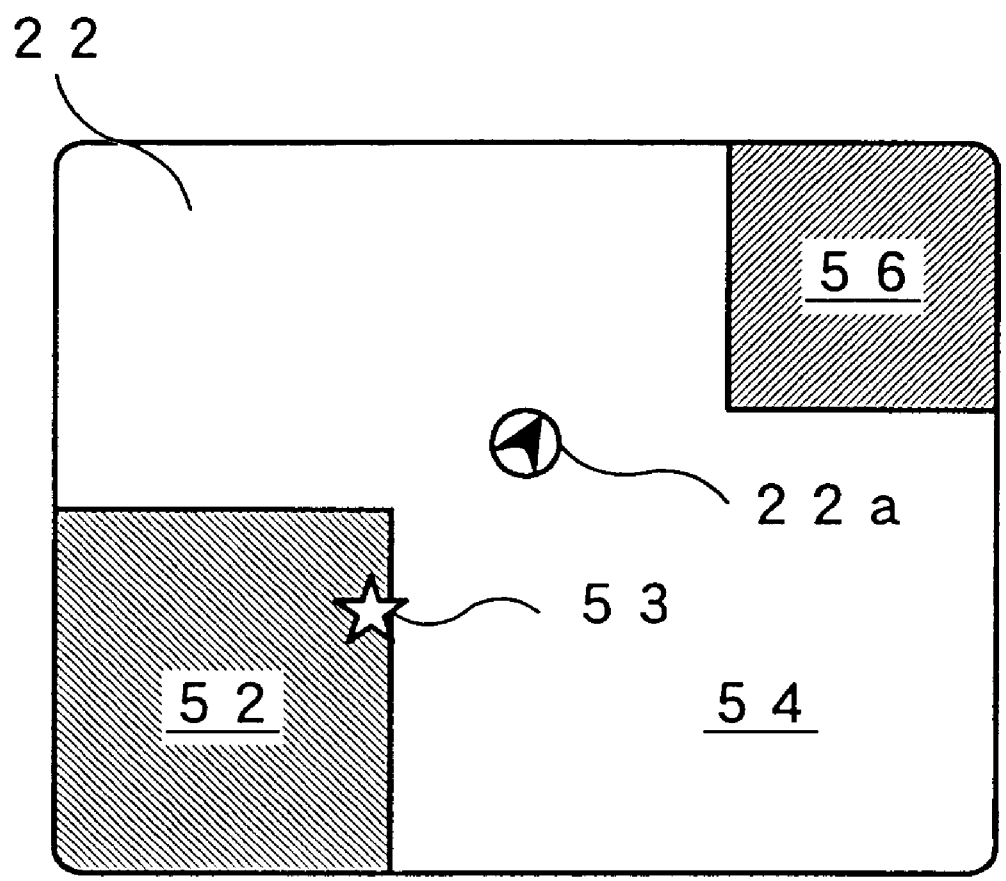
FIG. 14 is a diagram showing a no-map area where the present position is located and a portion of the adjacent map.
Figure 15:
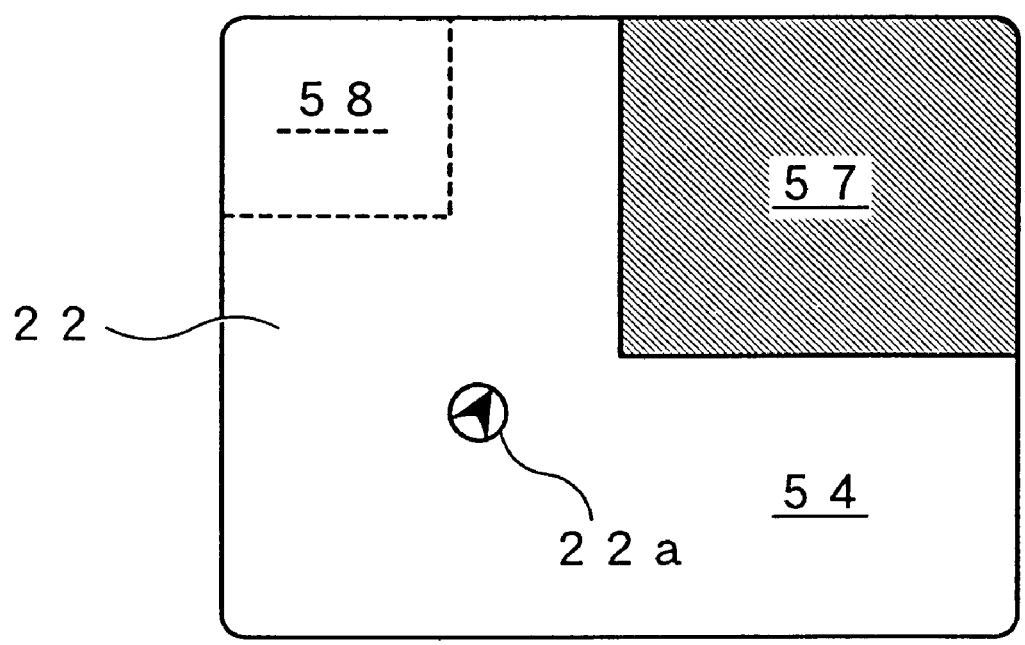
FIG. 15 is a diagram similar to FIG. 14 but showing portions of two adjacent maps.
Figure 16:
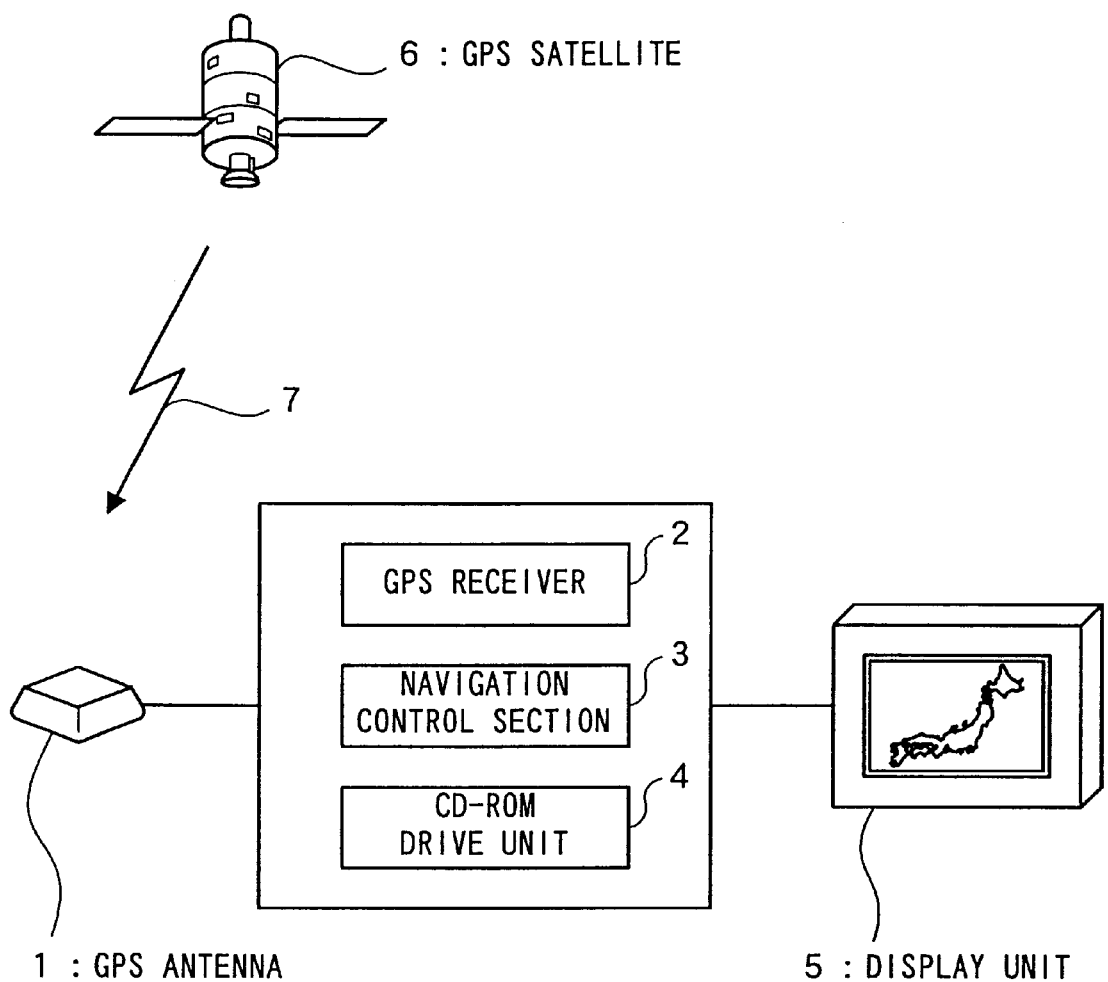
FIG. 16 is a schematic diagram showing a vehicle navigational system.

Furthermore, as shown in FIGS. 14 and 15, where the present-position mark 22a is in the no-map area 54, if, in the reduced scale of the screen, even a portion of the map that enters the screen has been stored, the stored map is displayed on the screen. The stored map is represented by reference numeral 56 in FIG. 14 or reference numeral 57 in FIG. 15. Note that a map to be displayed is not limited to one map. All the maps meeting conditions (e.g., reference numeral 58 in FIG. 15) may be displayed. By viewing maps 56, 57, and 58, the geographical features of the no-map area 54 can be predicted complementarily and the accuracy of the guidance of a route by conjecture can be enhanced. In addition, the method shown in FIG. 14 or 15 and the method shown in FIG. 13 may be used together.

While the present invention has been described with reference to the measurement of a position utilizing the GPS technique, the invention is applicable to the measurement of a position utilizing a small-zone type mobile telephone technique (personal handy-phone system (PHS)), in which a service area is divided into small zones with a radius of a few hundred meters to a few kilometers and radio communications is performed between a base station provided in each zone and mobile stations within the zone. The reason is that, in the small-zone type mobile telephone technique, the home memory station always grasps the zone position of each mobile state and the PHS with a small zone radius is not as accurate as the GPS but has a measurement accuracy of a few hundred meters.

What is claimed is:

1. A map display unit comprising:

position detection means for detecting its present position;

storage means for storing information about maps on various scales;

retrieval means for retrieving a group of maps corresponding to the present position detected by said position detection means from said storage means;

extraction means for extracting a map on the same scale as a map being displayed from the retrieved group of maps; and display control means for performing a process of synthesizing the extracted map and a mark representing the present position and then displaying them on display means;

wherein, when said present position moves out of a map being displayed and a new present position is not present in the stored maps, said display control means displays said new present position at a relative position with respect to said map being displayed, without a map.

2. The map display unit as set forth in claim 1, wherein said map being displayed, a position at which the present position moves out of said map being displayed, and said new present position are displayed at the same time.

3. The map display unit as set forth in claim 2 wherein, when said map being displayed is moved out of the screen by movement of said new present position, said display control means displays the direction and distance of said present position with respect to a position at which said map being displayed is moved out, along with said new present position.

4. A map display unit comprising:

position detection means for detecting its present position;

storage means for storing information about maps on various scales;

retrieval means for retrieving a group of maps corresponding to the present position detected by said position detection means from said storage means;

extraction means for extracting a map on the same scale as a map being displayed from the retrieved group of maps; and display control means for performing a process of synthesizing the extracted map and a mark representing the present position and then displaying them on display means;

wherein, when said present position moves out of a map being displayed and a new present position is not present in the stored maps, said display control means displays said new present position at a relative position with respect to said map being displayed, without a map; and wherein, when at least a portion of another map of the stored maps can enter the screen on which said present position is being displayed, said portion of the other map and said new present position on an area having no map are displayed at the same time.

* * * * *